Dec. 21, 1965  E. S. KNUDSEN  3,224,320
APPARATUS FOR DETERMINATION OF THE DISTRIBUTION OF MEAT
AND FAT IN SLAUGHTERED ANIMALS OR PARTS THEREOF
Filed March 28, 1960  6 Sheets-Sheet 1

INVENTOR
Erik Stenberg Knudsen

BY Stevens Davis Miller & Mosher

ATTORNEYS

Dec. 21, 1965  E. S. KNUDSEN  3,224,320
APPARATUS FOR DETERMINATION OF THE DISTRIBUTION OF MEAT
AND FAT IN SLAUGHTERED ANIMALS OR PARTS THEREOF
Filed March 28, 1960  6 Sheets-Sheet 6

INVENTOR
Erik Stenberg Knudsen

BY *Stevens, Davis, Miller & Mosher*

ATTORNEYS

United States Patent Office 3,224,320
Patented Dec. 21, 1965

3,224,320
APPARATUS FOR DETERMINATION OF THE DISTRIBUTION OF MEAT AND FAT IN SLAUGHTERED ANIMALS OR PARTS THEREOF
Erik Stenberg Knudsen, Roskilde, Denmark, assignor to Slagteriernes Forskningsinstitut, Roskilde, Denmark
Filed Mar. 28, 1960, Ser. No. 18,080
Claims priority, application Great Britain, May 5, 1959, 15,453/59
3 Claims. (Cl. 88—14)

The invention relates to a method for estimating the distribution of meat and fat in slaughtered animals or parts thereof.

With a view to estimating the quality of slaughtered animals a series of examinations is made comprising among other things the measuring of the thickness of fat in different portions of the carcass. The methods of measuring used so far are, however, subject to errors and uncertainty so that the slaughterhouses unintentionally may grade the meat, particularly pig carcasses, in a wrong class.

After having ascertained that pork graded according to current procedures on the basis of measurements of the thickness in several locations on the pig carcass nevertheless might exhibit a certain destitution of meat because the loin is insufficiently developed a new place of measuring was introduced lying opposite the hindmost rib of the pig and about 3 inches from the line of the back. The circumstance that the thickness of fat is decisive of the classification of the carcass has accentuated the need for developing measuring methods better than those applied so far.

Ordinarily the thickness of fat is measured by a special probe or measuring pin which is introduced through the layers of rind and fat until the probe strikes the deep fascia. If the thickness of fat as the place mentioned here as an example exceeds the fixed maximum value for pigs of first class or grade, the meat is disqualified for export.

The difficulties in an exact determination of the thickness of the fat layer is connected with the demand of a certain manual skill in order to feel when the probe meets the resistance offered by the deep fascia. There are also differences in measurings effected at different times after the slaughtering owing to the fact that the nature of the meat changes as a function of the time after the slaughtering. Experiments show that measurings effected by different persons on the same carcass may give different results even if the measurements are made in the same plate.

Investigations have been carried out regarding the possibility of making the measurements chemically or electrically but such methods have proved unsuitable partly because there are too great variations in the electrical resistances measured and partly because chemical methods are time-consuming. Furthermore a measuring method in order to be acceptable on an industrial scale, must be completed rapidly otherwise it creates a bottleneck in that part of the slaughterhouse operation.

It is the object of the present invention to provide a method which is quick and reliable and which avoids the deficiencies of known methods.

According to the present invention the method is characterized by the fact that an endoscope-like probe provided with graduations and/or stop is inserted a predetermined distance and thereafter on the basis of one single observation the position of the layer of separation between meat and fat reads the qantity of the meat in the examined place. It has been proved that the direct visual observation of the layer of separation between fat and meat can be effected quickly and reliably and that it does not demand any long preceding experience and that without difficulty there may be inserted a probe adequately made of a dimension so strong that the handling of the apparatus and the reading gets easy and quick enough for the method being used advantageously in industry.

The method can be adapted to the degree of classification needed which may e.g. depend on it being a continuous classification of animals to be slaughtered in order to serve as food or an exact measuring of the thickness of fat of animals studied for scientific purposes. If an exact indication of the thickness of fat is required the following method is used: The probe is inserted to such depth that a predetermined line of measuring in the illuminated window of the probe coincides with the layer of separation between meat and fat whereafter the distance between the line of measuring in question and the surface of the meat in the place of insertion is measured for determination of the quantity of the fat. By this method a reading e.g. in mm. can be achieved directly and quickly which may be important if material is examined for instance regarding an estimate of the value of the parents as breeders.

If it is intended to make a classification in two or three classes it is preferred according to the invention to proceed thus: the probe is inserted in such a way that the complete window having a length equal to interval corresponding to class II penetrates the surface and is inserted so far that the distance from the back line of the window to the surface is equivalent to the allowed maximum thickness of fat for meat of first class whereafter the meat is placed in the first class if only meat is observed, in the third class if only fat is observed, and in the second class if the line of separation between meat and fat is seen. By this embodiment of the method according to the invention the classification can be made quickly and objectively without use of specially qualified personnel which is required when a method is used in which not sight but feeling is decisive to the result of the measuring.

Apparatuses for examination of cavities, e.g. in the human body, are known. By an embodiment of such endoscope there is as fixtures a special tube which encloses a knife member which is inserted together with the tube in the wall through which is to be obtained entrance to the cavity which is to be observed. When the cutting through has taken place the knife member is retracted from the tube and instead the real endoscope is inserted through the tube which remains in the wall. Such apparatuses are, however, unsuitable for the execution of the method according to the invention and therefore the invention also relates to an apparatus which is characterized by a probe having a cutting front part and at the other extreme end is firmly connected with a housing or grip meant to be grasped by the whole hand. Behind the cutting front part the probe is provided with a window which is flush with the surface of the probe in addition to which the apparatus contains optical means for observation of the tissue through the window including means of illumination lying inside the apparatus to illuminate the tissue from within through the window and partly means for measuring the distance between a certain part of the window and the part of the probe that is flush with the face of the material into which the probe is inserted. During the insertion the probe shall cut its way through the tissue and as earlier mentioned the measuring can be effected by continuously observing the tissue passing the window and stopping when the interface between fat and meat registers a certain mark on the window, whereupon the thickness of fat can be read on a calibrated scale on the external surface of the probe. The apparatus may, however, also be arranged in such a way that it has a stop which is connected firmly, possibly adjustably with the probe. Such construction, which may also be adjustable, is described in more detail hereinafter.

In an embodiment of the apparatus according to the invention the built-in means of illumination is adjusted to illuminate partly the material which is to be observed through the window as well as a scale for reading the distance from a reference line to the surface of the material. In this construction an independence of external sources of illumination is achieved which may be appropriate when the work must be done under conditions where such illumination is poor, bad or unreliable.

It has been found that it may be difficult to read a scale marked out directly on the probe and by an embodiment of the apparatus it is preferred according to the invention that parallel to the longitudinal axis of the probe there is a sliding spring-like feeler the foremost part of which is arranged to get into contact with the surface of the material in the immediate vicinity of the place where the probe is inserted and which has an indicator of the depth of measuring. It is obvious that it is immaterial to the invention whether the scale is on the feeler and the indicator on the house of the apparatus or vice versa.

Before the reading of the scale an optical observation of the examined material through the window in the vicinity of the point of the probe is made. The observation is made by the built-in optical instruments through an ocular or a window. With a view to facilitating the observation and the reading there may by an embodiment of the apparatus according to the invention be found two windows placed side by side in the house of the apparatus for observation partly of the material through the optical system in the probe and the window near the point of the probe partly of the indicator for reading the depth of measuring.

If the scale according to the invention consists of translucent material it may be illuminated by transillumination.

The light source in the apparatus can be supplied with electric current from the outside or from batteries built into the house or handle of the apparatus. According to the invention there may be a switch, preferably a pushbutton type, for closing the electric circuit through an electric lamp for illumination of the material and/or the reading scale.

The conveying of the light from the light source to the window at the point of the probe may be done by any suitable optical system. In certain embodiments of the apparatus there is preferably a rod- or thread-shaped light conductor placed inside the probe and adjusted to transmit the light from a lamp house at the hindmost part of the apparatus to the window at the foremost part of the probe. A such light conductor which consists of limpid material e.g. so-called plastic is sturdy and does not as a glass demand special considerations during the mounting.

The front face of the light conductor can be made to lie parallel to the window at the point of the probe but it is preferred in one embodiment of the apparatus to let the light conductor run mainly straight and instead cutting the front face so that this forms an angle preferably an angle of 45° with the longitudinal axis of the light conductor whereby the light is reflected from this face and is ejected through the window lying at the point of the probe and thereby illuminates the material lying outside the window.

With a view to avoiding undesired reflections and an inadequate path of rays there may be outside the foremost oblique part of the light conductor a non-reflecting material such as a black coating on the bottom of an oblique mirror which besides serves to send the light reflected from the material outside the window back to the place of observation.

The feeler which is mounted outside or inside the house may be worked by hand or by means of a spring mechanism built into the housing which mechanism keeps the sliding feeler in the projected position. Whereby the feeler is maintained in constant contact with the surface of the material during the insertion of the probe into the material.

In another embodiment of the apparatus according to the invention there is on the outside of the housing a graduated scale along which can be moved an indicator firmly connected with the feeler for reading the distance between a certain place of the window to the foremost surface of the feeler. The measuring place on the window may e.g. be marked by a line possibly in the form of a groove on the inside of the window.

By providing the apparatus with a releasable brake member which secures the feeler in any position it is made to take up and which when it is released allows the feeler to return to its projecting position of rest by action of the spring mechanism the feeler remains in its position until the brake member is worked whereby the reading may be made after the probe is removed from the material being measured.

For measurements demanding great accuracy the apparatus may be constructed according to the invention as follows:

The part of the housing adjacent to the rearmost part of the probe is cylindrical and carries a revolving measuring bushing with a helical groove along which is a scale for reading and which engages an indicator member attached to the housing for controlling the movement of the bushing so that turning of the bushing causes an axial displacement of the bushing. The pitch on the helical groove is chosen adequately in such a way that a self-locking effect is obtained, i.e., that it is prevented that the bushing may turn by an axial pressure.

The optical system can be made in many different ways but the most simple and most adequate consists of mirrors or light conductors preferably in the form of flexible rods of a glass-clear plastic. According to the invention a filter may be interposed in the optical system for the purpose of increasing the contrast when passing from fat to meat.

For further explanation of the invention reference is made to the accompanying merely diagrammatical drawings, wherein.

Figure 1:
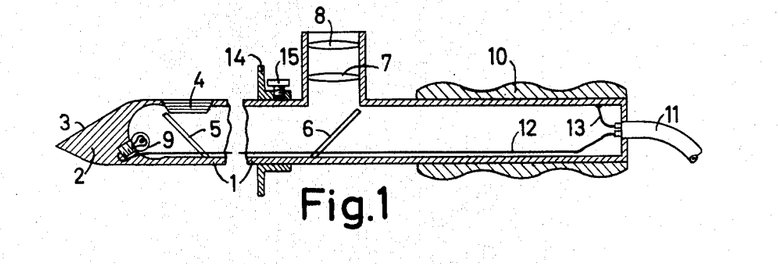
FIG. 1 shows a sectional view of an embodiment of an apparatus according to the invention.

In FIG. 1, 1 designates a tubular probe which may consist of any suitable material if desired with a surface coating, e.g., of chromium. The point 2 of the probe is made with a cutting edge 3 or if desired several cutting edges. The point of the probe may consist of another material than the preferably cylindrical tube wall of the probe, e.g., steel and chrome-plated brass respectively. The cross section of the probe may be of any suitable form, e.g., circular, elliptic or polygonal.

The probe is provided with a light aperture or window 4 through which the tissue being traversed can be observed. The observation is effected by means of an optical system which, in the example shown, consists of two oblique mirrors 5 and 6 and an ocular with lenses 7 and 8. In the example shown a small lamp 9 illuminates the tissue through the window 4. The surfaces in the space where the lamp 9 is situated are adequately reflecting. The window 4 is preferably designed in such a way that the greatest possible amount of light from the lamp is directed out towards the tissue. Instead of an optical system comprising mirrors a light conductor system consisting of a rod-shaped, glass-clear plastic can be used. The optical system may comprise a suitable filter for increasing the contrast when observing fat and meat respectively. In the example shown the observation through the ocular is made in a direction perpendicular to the axis of the probe. It is, however, also possible to place the ocular in the axial direction of the probe and thus make the mirror 6 superfluous.

At its rear end the probe is provided with a handle 10 and a current lead 11 for supplying current to the lamp 9. If the probe consists of a metallic material only the conductor 12 needs to be extended to the lamp as the material of the probe may be used as the other conductor. In this case the other lead 13 is connected with the wall of the probe.

In the example shown the axial direction of the handle is coincident with that of the probe. The handle may, however, also be mounted at right angles to the axial direction of the probe or it may be designed in some other suitable way. The probe is provided with an adjustable stop 14 having a finger screw 15. This stop can be displaced in the axial direction of the probe and adjusted to any desired value. The probe may be provided with graduations so as to permit a reading of the depth of insertion or preferably the distance from the front edge of the window to the outer side of the carcass. The apparatus is preferably intended for measuring of the thickness of the fat layer of pig carcasses but may also be used for measurings of other materials.

Figure 2:
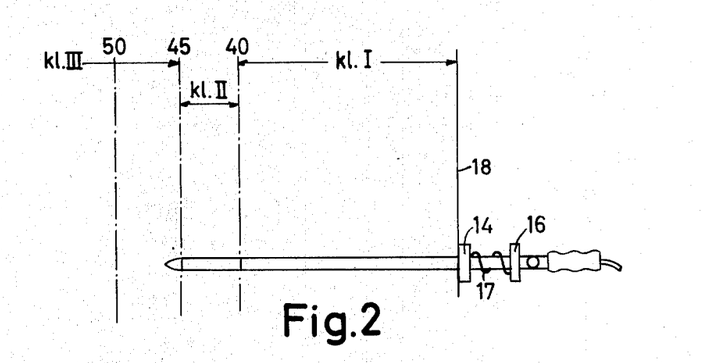
FIG. 2 shows a sectional view of a pig carcass with the apparatus according to the invention inserted for the purpose of measuring.

FIG. 2 exemplifies he performance ot a measuring where it is desired to classify pig carcasses in three classes on the basis of measurings effected at a definite point of measuring. As an example it is assumed that it be desired to classify the pig carcasses in three classes, I, II and III respectively characterized in that the layer of fat for class I does not exceed 40 mm., and for class II does not excede 45 mm., and for class III thicker than 45 mm. The apparatus is inserted until the fixed stop gets into contact with the surface 18 of the pig carcass. The stop is so adjusted that the distance from the stop to the back edge of the window is 40 mm., and the apparatus is so arranged that the length of the window in the axial direction is 5 mm. Considering the different positions of the layer of separation between fat lying at the right-hand side of the figure and meat lying at the left-hand side of the figure it will be seen that the visual impression of the tissue outside the window will depend on the position of the layer of separation. If the layer of separation lies along the dot-and-dash line 40 the window is lying wholly in the meat and it will not be possible to see the line of separation. So the pig carcass may be classified in class I. If the layer of separation moves from the dot-and-dash line 40 to the left in the direction of the dot-and-dash line 45 a line of separation between fat at the right-hand side of the figure and meat at the left-hand side of the figure will be observed and as long as this line of separation is visible the pig carcass belongs to class II. If the line of separation lies to the left of the dot-and-dash line 45 only fat will be seen which gives a substantially lighter visual impression than the meat and the pig carcass must therefore be classified in class III.

If it be desired to classify in more classes the stop may be displaced in accordance with the limit measures fixed. As indicated in FIG. 2 there may if so desired be provided two stops 14 and 16 of which the former is displaceable and actuated by a spring 17 but arranged so that it in the beginning is fixed but at the moment when it is desired to perform a measuring deeper in the carcass it can be released so that the two stops are brought wholly or substantially, into contact with each other. When the apparatus is removed from the pig carcass the spring 17 will return the stop 14 to its projected position in which it is automatically locked, e.g., by a turning provided by the spring 17.

The window may consist of glass or some other suitable transparent material and the surface may have the form of a cylinder section so that the outer surface of the window is in flush with the surface of the probe.

Instead of a built-in lamp light may be projected through the probe, e.g., from a lamp house placed at the end of the apparatus. The lamp house may be built into one half of a handle placed transversely of the axial direction of the probe and the other half of the handle may hold the ocular. Instead of a coloured filter the lamp itself may be arranged to emit coloured, e.g., green light.

Figure 3:
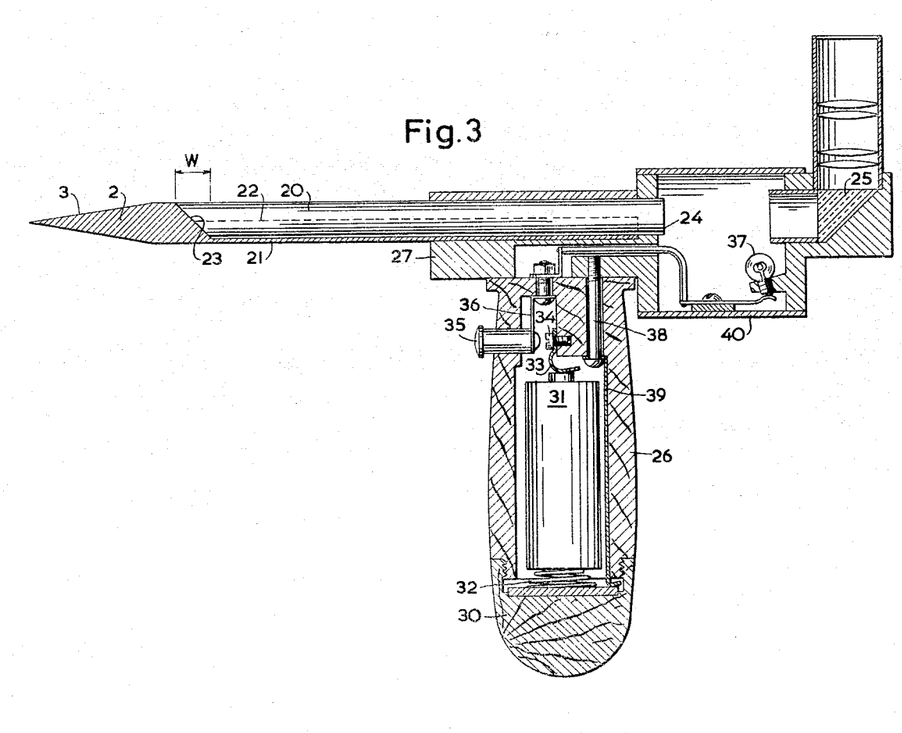
FIG. 3 shows a sectional view of another embodiment of an apparatus according to the invention, FIGS. 4 and 5 respectively shows partly in section a side elevation and a top plan view of a third embodiment of the apparatus according to the invention.

In the embodiment shown in FIG. 3 there is a light conductor 20 which may, e.g., consist of a glasslike rod with a cross section fitting into a gully-shaped holder 21 of metal the top defining line of which is shown in a dotted line. The light conductor 20 is at the end nearest the front edge of the probe cut off obliquely and the face 23 forms an angle of 45° with the longitudinal axis of the probe. The field of vision corresponding with the window 4 in FIG. 1 is denoted W. The rays of light coming from the right-hand side of the figure and passing through the light conductor 20 are reflected from the face 23 and pass through the wall of the light conductor and illuminate the surroundings. From here light is reflected and is again reflected from the face 23 towards the right side through the light conductor 20. After having passed through the plane face 24 of the light conductor being at right angles to the longitudinal axis of the probe the light is refracted in a prism 25 and is emitted through the ocular. In between the face 24 and the prism 25 is a lamp house 40 with one or several lamps 37 which can emit light through the face 24. The lamp house may be black inside and there may be found mirrors not shown which reflect the light of the lamps in the direction of the said face.

The handle 26 of the apparatus is fastened to a holder 27 which at one end carries the lamp house 40 and which further carries the holder 21 with the light conductor 20 the said holder consisting e.g. of two parts being clamped together by a screw thus fixing the light conductor. The handle is hollow and closed at the bottom by a cap 30. In the handle is an electric element 31 the upper contact of which by a spring 32 is pressed against a contact spring 33 which is connected electrically with a fixed contact 34 in a pushbutton switch 35 the other movable contact of which 36 by a wire is connected with one contact of the electric lamp 37 the other contact of which is connected with the conductive apparatus house which by a screw 38 a wire 39 and the spring 32 is connected electrically with the bottom contact of the element.

The apparatus may be used in the way described in FIG. 2 where the front part of the holder 27 serves as a stop by the insertion of the probe into the material.

Figure 4:
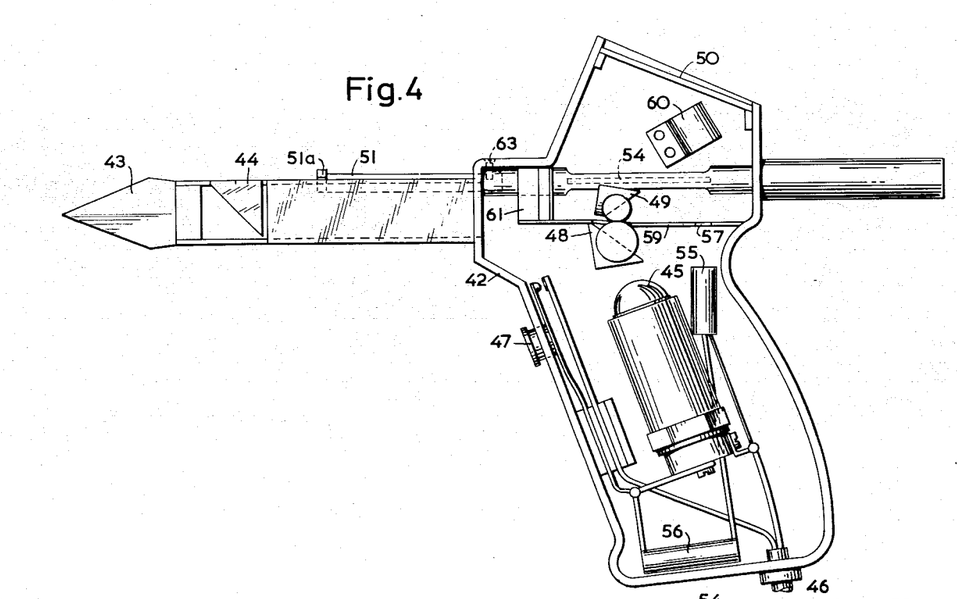
Figure 5:
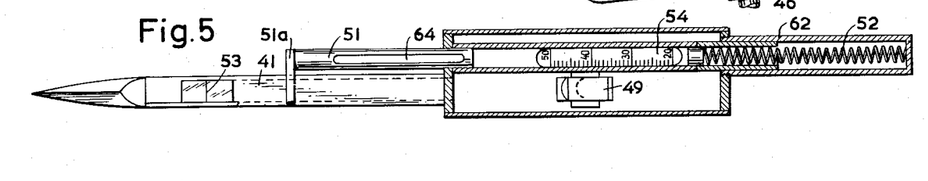

By the embodiment of an apparatus shown in FIGS. 4 and 5 according to the invention there is a probe 41 which is firmly connected with a house 42 which serves partly as handle partly as container of means of illumination and optics.

The probe 41 has a mainly rectangular cross section and carries at the end a mounted steel point 43 which is ground in with cutting edges. The probe 41 is hollow and carries at the front part behind the cutting edge 43 a prism 44 the one side face of which serves as a window. In the part of the house 42 which is made as a handle there is an electric lamp 45 which through a wire 46 is supplied with electric current by a pushbutton 47 placed in the wall of the house. A prism 48 stationarily mounted in the house serves to emit light from the lamp 45 to the prism 44 and then through the window. The light reflected through the window is by the prism 44 refracted to another prism stationarily mounted in the house which prism refracts the light to an observation window 50 in the top of the wall of the house 42.

With a view to facilitating the reading of the thickness of fat there is a rod-shaped feeler 51 mounted in the house displaceable to the pressure of a spring 52. The feeler 51 has at its foremost part a contact face 51 at which when the probe 41 is inserted in the material gets into contact with the surface of the material and is hereby displaced to the right of FIG. 5 a distance corresponding with the depth of insertion reckoned from a certain line in the window, e.g., the line 53 of FIG. 5. The feeler may carry a graduated scale 54 from transparent material observable through a window not shown situated by the side of the window 50. When the two windows lie side by side it can at the same time be observed when the line of separation between meat and fat will coincide with the line of measuring 53 and which value on the scale corresponds with the depth of insertion hereby ascertained.

Illumination of the scale 54 may possibly be arranged by one and the same lamp but in the shown case there is a special scale lamp 55 which is supplied with current by the wire 46 in the same way as does the lamp 45 but so that there is inserted a resistance 56. The lamp 55 emits light through an opening 57 in the partition 59 which divides the house into two parts which are thus mutually screened to light. The light passing the opening 57 and the scale 54 is refracted by an optic 60 through a window situated by the side of the window 50 so that the scale may be observed.

In the path of rays between the prism 44 and the prism 49 may be placed a lens 61. The feeler 51 is partly guided by the front part of the house 42 partly in a tubular part 62 which is firmly connected with the house and contains the spring 52. By a screw 63 situated in the wall of the house sticking into a gully-shaped dent 64 in the feeler 51 is obtained partly a control of the feeler partly determination of its terminal positions.

Figures 6, 7, 12:
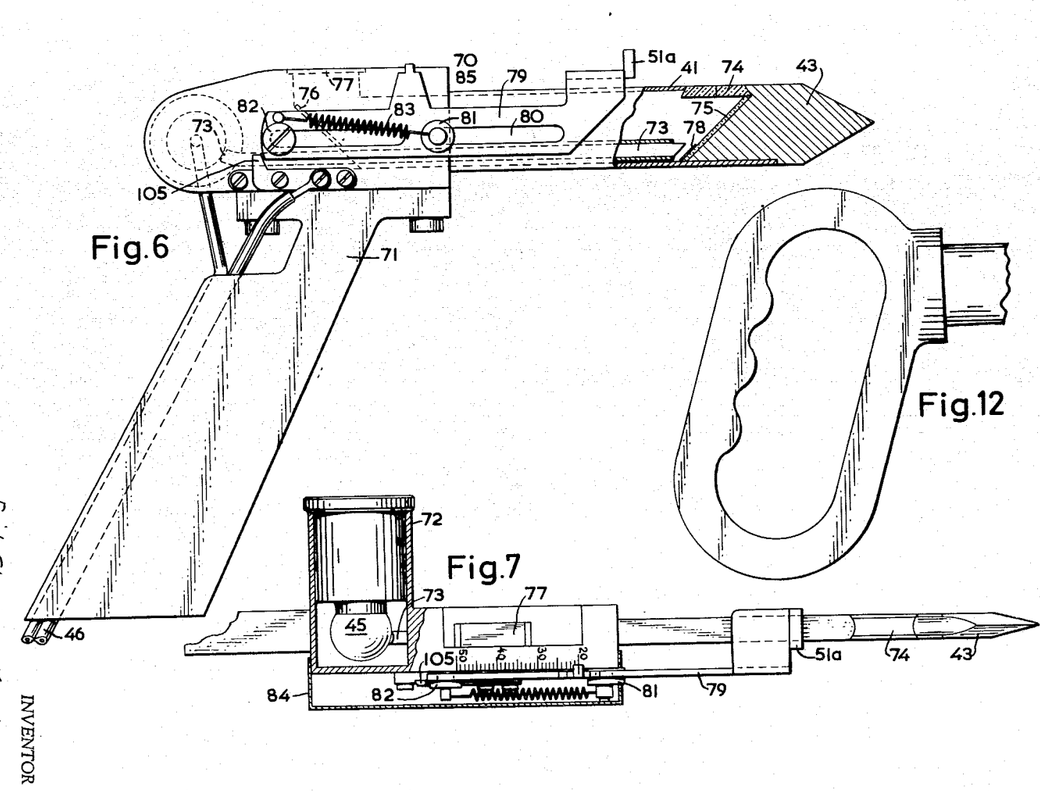
FIGS. 6 and 7 show partially sectional views seen respectively from one side and from above of a fourth embodiment of the apparatus according to the invention.
FIG. 12 shows a modification of a handle for an apparatus according to the invention.

In the embodiment shown in FIGS. 6 and 7 the parts corresponding with the parts in FIGS. 4 and 5 have the same references. The probe 41 with the point 43 is fixed to a house 70 which carries a handle shaped like a pistol butt 71. The house 70 is at the hindmost part made as a lamp house 72 into which a lamp 45 in a socket can easily be placed and removed. The light from the lamp 45 is led by a light conductor 73 one end of which lies in the lamp house and the other end near the point of the probe to illumination of a window 74. At the foremost part the light conductor is cut off obliquely preferably at an angle of 45° so that the face may serve to reflect the light out through the upper side of the light conductor up through the window 74. An oblique mirror 75 reflects the light coming through the window 74 and refracts it to a mirror 76 so that the material lying outside the window 74 may be observed through an observation window 77 in the wall of the house 70. The part of the mirror 75 which lies opposite the end of the light conductor 73 has been made unreflecting, e.g., by a black coating 78 regarding avoidance of disturbing reflexes.

The feeler 79 corresponding with the feeler 51 in FIG. 4 consists in the embodiment in FIG. 6 of plate material out of which has been cut a longitudinal slit 80 in which there are two guide spindles 81 and 82 fixed by screws to the house 70. A helical spring 83 one end of which is fixed to the feeler and the other end of which is firmly connected with the house serves to keep the feeler in the projected position. The mechanism described is shielded by a cap 84 shown in FIG. 7 but removed in FIG. 6. Between the real house and the cap 84 there is at the top a gap through which an indicator 85 placed on the feeler projects and indicates the position of the feeler in relation to a scale engraved on top of the house.

Figure 8:
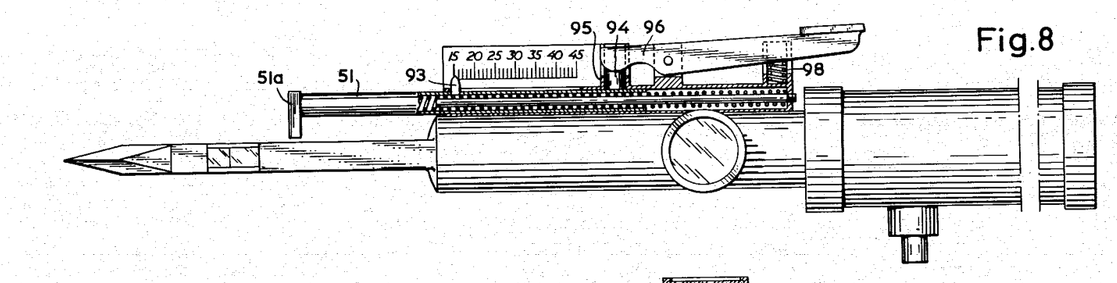
FIGS. 8 and 9 show partial sectional views seen respectively from above and from one side of a fifth embodiment of the apparatus according to the invention.
Figure 9:
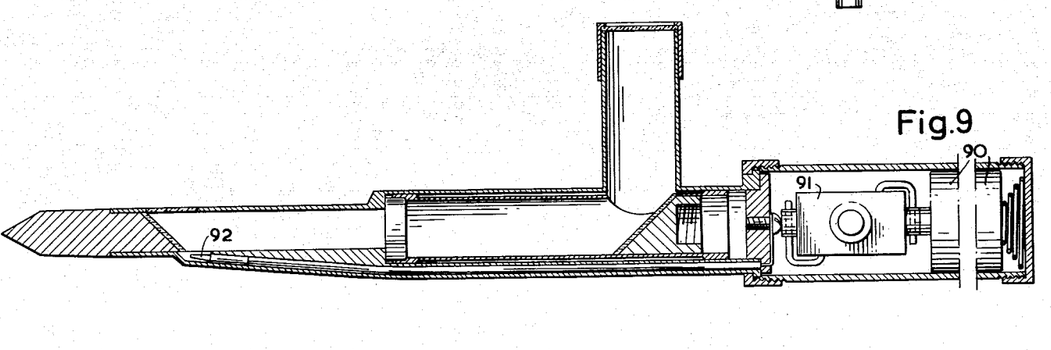

By the embodiment shown in FIGS. 8 and 9 the axis of the handle coincides with the axis of the probe and into the handle are built elements 90 and a switch 91 through which an electric lamp 92 of the endoscope type is supplied with current which lamp with socket and wires is pushed into a canal situated in the underside of the probe. The feeler 51 works after a similar principle as does the feeler in FIG. 4, but is different to this in two respects. Firstly the scale is mounted stationarily on the house of the apparatus while the feeler carries an indicator 93. Secondly there is a brake mechanism consisting of a brake-shoe 94 loosely placed inside a tubular part 95 and is with its underside in contact with the feeler while the top side is actuated by a lever arm 96 in a two-armed lever 96, 97 the other arm of which is actuated by a spring mechanism 98. The mechanism described served to secure that the feeler 51 is kept in the position it has reached after a given insertion into a material without regard to the probe being pulled out of the material. The reading may therefore take place any time and if desired under better lighting conditions. By pressing down the lever arm 97 against the action of the spring mechanism 98 the feeler 51 is allowed to jump back to its projected position by the action of a spring.

Figures 10, 11:
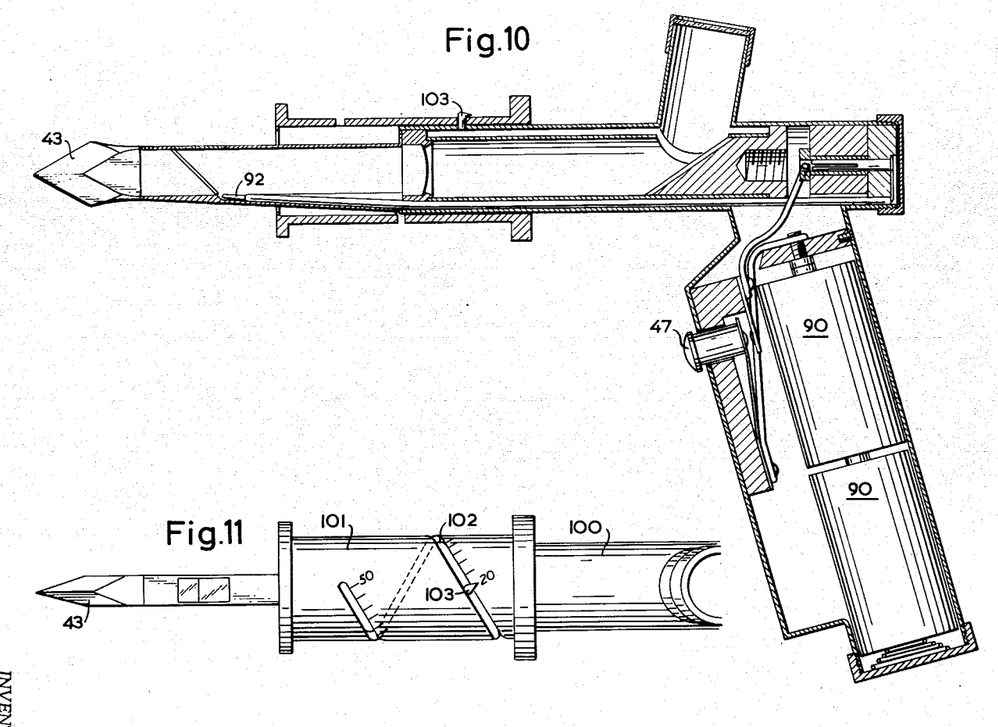
FIGS. 10 and 11 show respectively a side sectional view and a top elevation of a sixth embodiment of the apparatus according to the invention.

By the embodiment shown in FIGS. 10 and 11 of the apparatus according to the invention a part of the house 100 is made circular cylindrical and on this part of the house is mounted a swivel bush 101 which has a helical groove 102 along which is marked scale graduations and into which an indicator needle 103 projects the said indicator needle is fastened onto the cylindrical house. The bush 101 may be demountable for cleaning, e.g., in such a way that the indicator 103 may be loosened or that the helical groove reaches the end of the bush and if desired is barred by a spring mechanism in this end to prevent that the bush unintentionally falls off. By an adequate choice of the pitch of the helical groove 102 it can be avoided that the bush turns as a result of an axial pressure.

The apparatus which is described in connection with FIGS. 10 and 11 may be used thus: during the insertion of the probe the bush is slowly turned and hereby the speed of insertion is controlled so that there is quicklier reached a depth of insertion where the line of separation between meat and fat coincides with the line of measuring in the window at the end of the probe.

FIG. 12 shows a per se known embodiment of a handle which in certain cases can be used advantageously on an apparatus according to the invention. It offers the advantage that the transmission of power from hand to probe may take place in the axial direction so that no torque will arise during the insertion of the probe.

In apparatuses with a sliding feeler the movement of the feeler may be used in an automatic working of an electric switch so that the current to the lamp is switched on as soon as the feeler is moved. Such a construction is as an example used in the apparatus in FIGS. 6 and 7 where the electric contact is denoted 105.

I claim:

1. A device for measuring the thickness of tissue layers beneath the outside surface of an animal carcass comprising in combination a hollow probe having a closed outer end provided with means thereon for penetrating said surface and said underlying tissues, a window in the wall of said probe adjacent said penetrating means, a reference point on said window, optical means for observing tissue adjacent said window, means for illuminating said tissue through said window, and means on the exterior of said probe remote from said outer end for determining the distance between said reference point on said window and said surface.

2. A device as set forth in claim 1 in which the distance determining means comprises a stationary indicator mounted on the probe and a feeler element displaceable longitudinally along said probe adjacent said indicator.

3. A device as set forth in claim 1 in which the probe is cylindrical and the means for determining the distance between the reference point and the surface comprises a cylindrical bushing rotatably mounted on the exterior of said probe and having a helical slot therein, a pin member fixed on the probe and engaging said slot, and a graduated scale on said bushing adjacent to and extending along said slot.

References Cited by the Examiner
UNITED STATES PATENTS

| | | | |
|---|---|---|---|
| 939,035 | 11/1909 | Kolb | 126—6 |
| 1,143,165 | 6/1915 | Begusch | 33—166 |
| 1,991,315 | 2/1935 | Gage | 17—45 |
| 2,235,979 | 3/1941 | Brown | 128—6 |
| 2,301,460 | 11/1942 | Sauer | 88—1 |
| 2,325,831 | 8/1943 | Cameron | 128—7 |
| 2,400,371 | 5/1946 | Reeser | 33—169 |
| 2,699,770 | 1/1955 | Fourestier et al. | 128—6 |
| 2,763,935 | 9/1956 | Whaley et al. | 33—169 |
| 2,764,149 | 9/1956 | Sheldon. | |
| 2,778,267 | 1/1957 | Miller | 88—14 |
| 2,858,416 | 10/1958 | Hover | 240—2.18 |
| 2,898,802 | 8/1959 | Ljungberg et al. | 88—14 |

FOREIGN PATENTS

| | | |
|---|---|---|
| 184,668 | 2/1956 | Austria. |
| 866,399 | 5/1941 | France. |
| 962,558 | 4/1957 | Germany. |
| 19,585 | 1/1904 | Great Britain. |
| 703,430 | 2/1954 | Great Britain. |
| 248,521 | 5/1947 | Switzerland. |

DAVID H. RUBIN, *Primary Examiner.*

WILLIAM MISIEK, JEWELL H. PEDERSEN,
*Examiners.*